(12) United States Patent
Otto et al.

(10) Patent No.: US 7,397,368 B2
(45) Date of Patent: Jul. 8, 2008

(54) REMOTE FIELD COMMAND POST

(76) Inventors: Kevin L Otto, 908 Oklahoma Ave., Milwaukee, WI (US) 53215; John Crocket, 415 E. Vine St., #314, Milwaukee, WI (US) 53212; Roger Shing Yan Lam, 1725 N. Prospect Ave., Apt. 806, Milwaukee, WI (US) 53202

( * ) Notice: Subject to any disclaimer, the term of this patent is extended or adjusted under 35 U.S.C. 154(b) by 246 days.

(21) Appl. No.: 11/232,186

(22) Filed: Sep. 21, 2005

(65) Prior Publication Data

US 2006/0071775 A1 Apr. 6, 2006

Related U.S. Application Data

(60) Provisional application No. 60/612,237, filed on Sep. 22, 2004.

(51) Int. Cl.
   *G08B 1/08* (2006.01)
   *H04Q 7/00* (2006.01)
(52) U.S. Cl. .................. 340/539.22; 340/521; 340/540; 348/143
(58) Field of Classification Search .................. 340/506, 340/521, 540, 539.22; 348/143
   See application file for complete search history.

(56) References Cited

U.S. PATENT DOCUMENTS 6,636,256 B1 * 10/2003 Passman et al. ............. 348/143

| | | | | |
|---|---|---|---|---|
| 2003/0025599 A1 * | 2/2003 | Monroe | ....................... | 340/531 |
| 2003/0025791 A1 * | 2/2003 | Kaylor et al. | ............... | 348/143 |
| 2003/0128113 A1 * | 7/2003 | Chang et al. | ................ | 340/506 |
| 2004/0001142 A1 * | 1/2004 | Kumhyr | ..................... | 348/143 |
| 2004/0008253 A1 * | 1/2004 | Monroe | ....................... | 348/143 |
| 2005/0132414 A1 * | 6/2005 | Bentley et al. | .............. | 725/105 |
| 2006/0071130 A1 * | 4/2006 | Kopitar et al. | .............. | 248/157 |
| 2006/0209187 A1 * | 9/2006 | Farneman | .................... | 348/143 |
| 2007/0052804 A1 * | 3/2007 | Money et al. | ............... | 348/143 |

* cited by examiner

*Primary Examiner*—George A Bugg
*Assistant Examiner*—Travis R Hunnings
(74) *Attorney, Agent, or Firm*—Andrus, Sceales, Starke & Sawall, LLP

(57) ABSTRACT

A communication and intelligence gathering system and method for monitoring a crisis scene from a remote command post. The system includes an access node positioned within communication range of multiple observation platforms that each provide information relating to the crisis scene, such as a video feed. The access node communicates with a main transfer module that relays the audio/video/data from the crisis scene to a main transfer module remotely positioned. A second main transfer module communicates with a field command post such that personnel at the field command post can monitor, react to and manage the crisis situation from the remote location. The access node position near the crisis scene also communications video and relevant information to field agents such that the field agents can monitor the video and information from a hand held/portable device.

13 Claims, 4 Drawing Sheets

US 7,397,368 B2

REMOTE FIELD COMMAND POST

CROSS REFERENCE TO RELATED APPLICATIONS

The present application is based on and claims priority U.S. Provisional Patent Application Ser. No. 60/612,237, filed on Sep. 22, 2004.

BACKGROUND OF THE INVENTION

The present invention relates to a system and method for remotely monitoring a crisis situation. More specifically, the present invention relates to a system and method that provides a real time video feed to a remote monitoring location for remotely monitoring a crisis situation.

In fighting terrorism, and in crisis situations, the most effective weapon will be information, not fire arms. Reliable, accurate and timely information defines every tactical operation, particularly those involving terrorism. Although current methods and technology exist for obtaining information, sharing this information with deployed field units in the battle against a terrorist threat has proven to be a significant challenge. In order to better combat the challenges raised by increasingly diverse threats, such as terrorism and natural disasters, technology must increase the situational awareness of the conflict situation. An increase in situational awareness will allow field personnel to make better decisions based upon a better understanding of the situation as a whole.

Currently, there exists many different systems for many different applications both for tactical and surveillance uses. As technology progresses, the amount of complicated equipment will only increase. Thus, there is a need for an adaptable system that can cover many varieties of situations with the ability to expand, upgrade and create an umbrella that can encompass all types of situations with minimal types of equipment and training.

Further, because a terrorist threat or natural disaster can often occur at remote locations, it is desirable to have the ability to bring in outside experts to provide guidance, expert advice, and command strategies to the tactical situation. Such experts may be located at remote locations across the country or across the world at the time the terrorist threat occurs. Therefore, it is desirable to bring such experts into the situation on a real time, live basis. In accordance with the present invention, a audio/video/data link system is developed to provide an ability to create a modular and scalable virtual command post, where the limitations of geography and time are removed. In such a system, all personnel involved with an operation, including those thousands of miles away and in different time zones, will be able to actively participate in solving the terrorist threat.

SUMMARY OF THE INVENTION

The present invention provides interoperable communication and intelligence gathering solutions, which will accelerate the development of open systems-based interoperable architectures and approaches. The present invention achieves the goal of a system-of-systems, by which public safety agencies of various jurisdictions will be fully interoperable when required, while allowing an enhanced, adjustable, and expandable degree of improved situational awareness. The present invention functions in conjunction with existing equipment from different manufacturers. The system of the invention is based on mainstream technology and standards, as well as being a self contained system able to work outside of current power and communication restrictive infrastructures. The present invention is scalable to support daily activities as well as large-scale events. The present invention will make use of Voice over Internet Protocol (VoIP) and wireless broadband data communications. The utilization of IP-based technology brings information not only to the personnel on the scene and within a one mile radius, but also to experts and other authorized personnel anywhere in the world. The system at the present invention not only enhances audio interoperability, but also provides video and sensory data that can be recorded, analyzed and archived to improve public safety's decision-making capabilities.

BRIEF DESCRIPTION OF THE DRAWINGS

The drawings illustrate the best mode presently contemplated in carrying out the invention. In the drawings.

DETAILED DESCRIPTION OF THE PREFERRED EMBODIMENT

Figure 1:
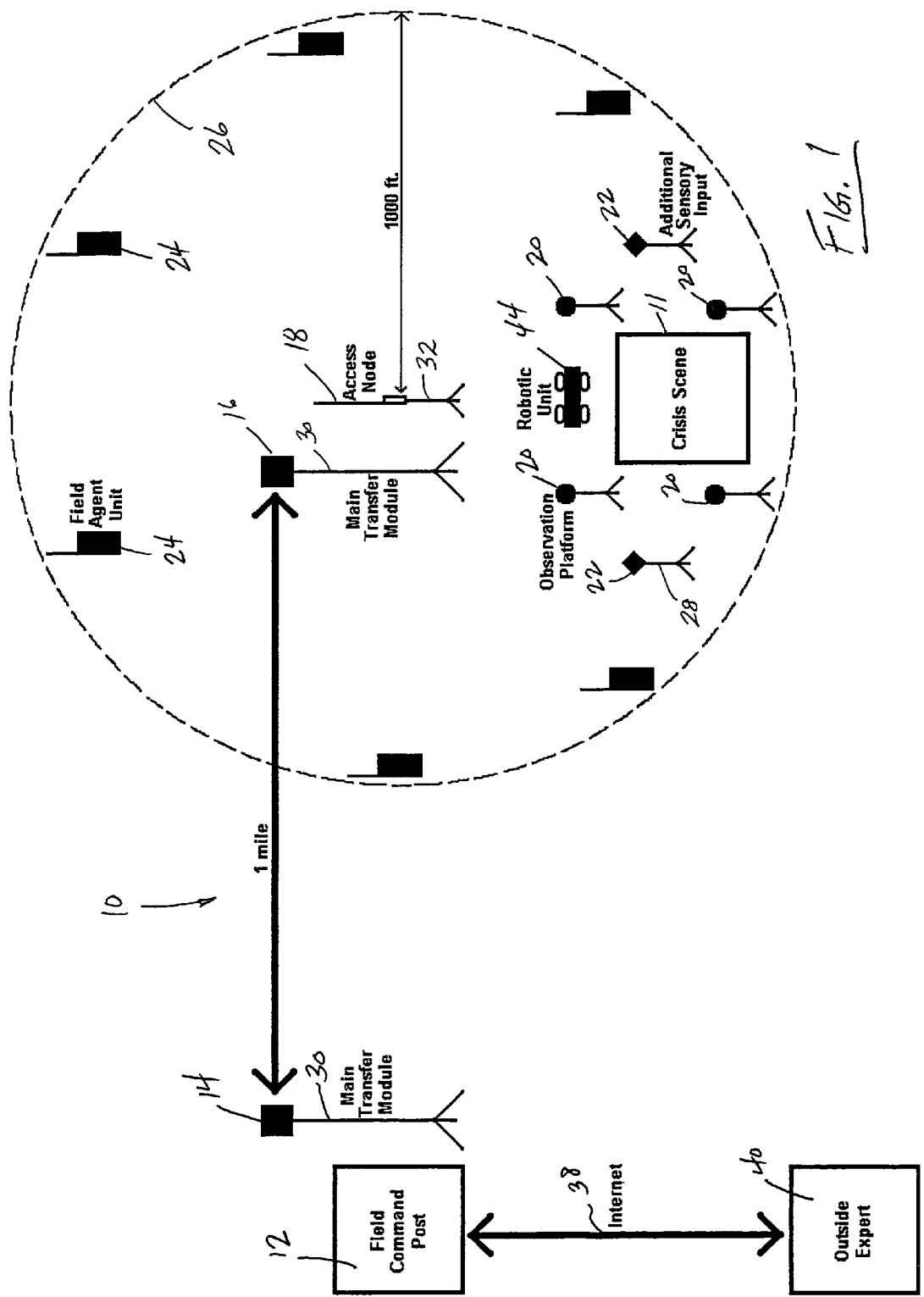
FIG. 1 is a schematic illustration of the field command post of the present invention as utilized with four observation platforms.

FIG. 1 illustrates a surveillance and monitoring system 10 of the present invention. The surveillance monitoring system 10 is shown as utilized in monitoring a hostage or crisis situation occurring within a building, as referred to by reference number 11. The surveillance monitoring system 10 includes a remote field command post 12 that is located remotely from the crisis scene 11. The field command post 12 can be included within a remote van or can be set up at a remote location staffed by rescue and/or law enforcement personnel. In the embodiment of the invention illustrated, the field command post 12 may be located up to one mile from the crisis scene 11. However, it is contemplated that the field command post 12 could be located a further distance from the crisis scene 11 depending upon the range of the wireless transmission.

The surveillance and monitoring system 10 shown in FIG. 1 includes a main transfer module 14 positioned near the field command post 12 and a second main transfer module 16 positioned near the crisis scene. The main transfer modules 14,16 communicate to each other through a wireless communication platform. In the embodiment of the invention shown in FIG. 1, the main transfer modules 14,16 communicate to each other using a 5.8 GHz ISM band that requires no licensing and no permits. The main transfer modules 14,16 utilize wide-band orthogonal frequency division multiplexing (W-OFDM) technology that is designed specifically for non-line of sight transmission in metropolitan areas.

The main transfer module 16 is shown positioned next to an access node 18. The access node 18 includes a wireless transceiver that can communicate with one or more observation platforms 20, multiple monitoring sensors 22 and multiple field agent units 24. In the embodiment of the invention illustrated, the access node 18 can receive information from any of the observation platforms 20, monitoring sensors 22 or field agent units 24 positioned within the wireless communication area 26. In the embodiment of the invention illustrated, the wireless communication area 26 has a radius of approximately 1,000 feet. Thus, any of the devices within the communication area 26 can communicate to the access node 18. The access node 18, in turn, includes an omni-directional antenna that can transmit signals for receipt by the devices and the main transfer module 16. The main transfer module 16 can communicate the received signals to the second main transfer module 14.

In the embodiment of the invention shown in FIG. 1, the access note 18 is in communication with four separate observation platforms 20. Although only four observation platforms 12 are shown in the preferred embodiment of the invention, additional observation platforms 20 can be used with the system of FIG. 1. The number of observational platforms and their functionality can be tailored to the situational need.

Each observation platform 20 comes equipped with an IP addressable camera that is capable of 360° pan-tilt-zoom for optical intelligence gathering. Each camera contains a built-in microphone that is able to gather audio data from upwards of 10 ft. away. Each camera is up-gradable such that each camera could have 22× digital zoom, low lux/IR light sensitivity, and a speaker addition for full duplex conversation between the field command unit post 12 and the observation platform 20. Each camera is mounted to a base and includes a dome structure to ensure weatherproof, rugged operation. Each base is easily attached to a tripod 28 without and required tools. Along with camera and speaker technology, the observational platforms 20 can accommodate the addition of sensors due to the systems use of IP based, open source technology. These sensors can include, but are not limited to sensors to detect threats such as chemilogical, biological, and radiological, motion sensors, heat sensors, and ranging sensors. Because of the continued advances of computer based technology, new sensors and other types of digital hardware will become available that can be easily interfaced in this system. A good example of this is the Zigbee protocol which can accommodate many types of low power consumption sensors made for long duration of operation.

Each tripod 28 is easily set-up and deployed in under thirty seconds. The tripod stands 28 are weatherproof, waterproof, and can withstand high winds. The stand alone, without camera or connection-junction box, only weighs 5.5 pounds.

Preferably, each observation platform 20 is powered via a supplied battery pack (not shown). The battery and all charging components are preferably included in a Pelican case (1300 Series). Once the battery is fully charged, the battery will power each platform upwards of 24 hours. If more time is needed at the crime scene, there are a number of alternate solutions for power, including:

The supplied battery pack could be switched out with another one that is fully charged.

A car/lawn battery could be purchased from a hardware store and connected to the supplied battery pack. Due to the extensive power requirements of deployability and length of operation, car/lawn batteries are the only batteries that come pre-charged with this kind of power. This will power the system for minimum of 24 hours.

The observation platform 20 could be run off of a vehicle, generator or other power source if extremely long periods of time are needed (upwards of 1-2 days).

If obscure options for power are needed, a solar panel charging system can be used with the observation platform 20. Also, if 120 VAC is accessible, the system could be powered by this as well, but is not recommended for deployment purposes.

All of the components mentioned for the observation platform 20 are all packaged into a roll-out carrying case that holds the camera/base/dome units, the tripod units, and the battery pack units. Once the case is opened, each tripod 28 is set up, the camera is mounted to each tripod, and the battery pack unit is connected to the camera and antenna (optional). All four observation platforms 20 shown in FIG. 1 are deployable in under 7-8 minutes.

In order to accomplish sending the gathered intelligence one mile plus away to the field command post 12, a wireless communication platform has been devised to send the gathered information up to one mile in full, real-time, to the field command post 12 for distribution/redistribution and collaboration of upper echelons, commanders and field agents. The ability to bring critical, on scene information in real time to a safe and protected area for commanding personal will become increasingly important due to the elevated level of lethal threat that terrorism has introduced.

Figure 2:
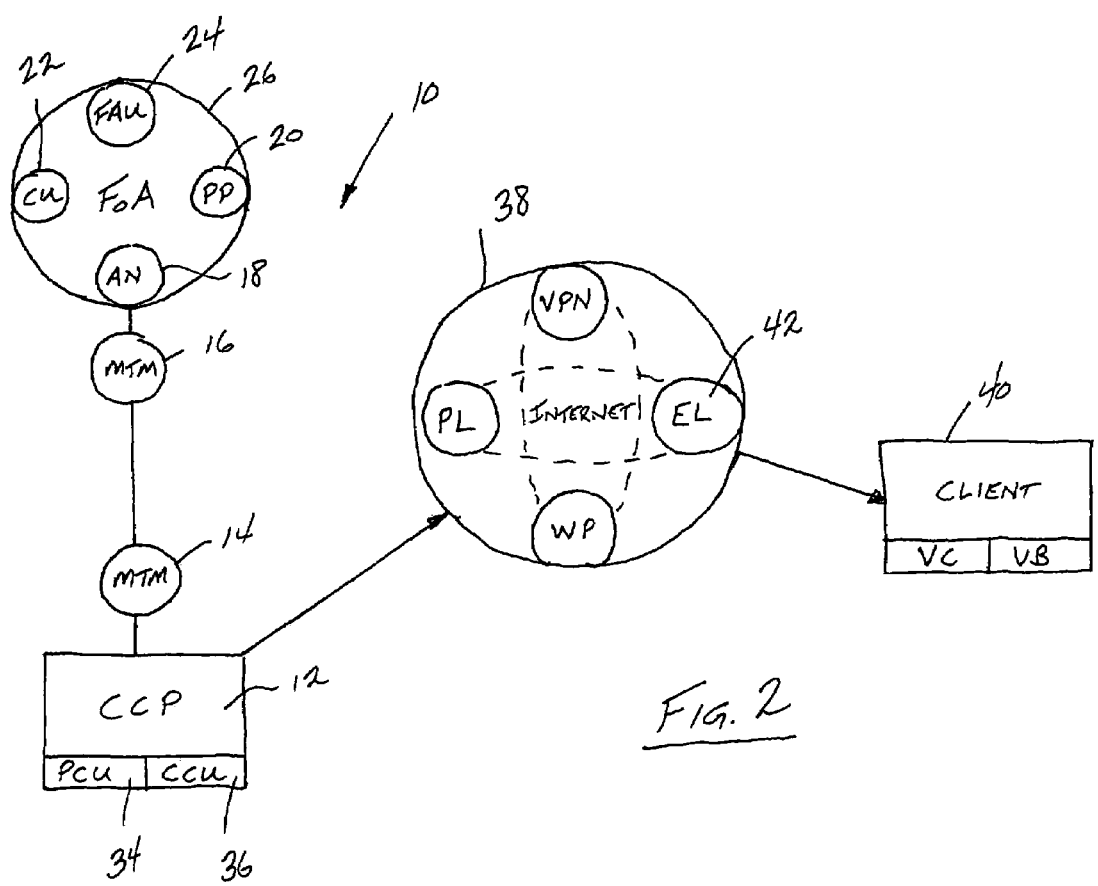
FIG. 2 is a schematic illustration showing the communication between the observation platforms, field command post and external clients connected through the Internet.

As shown in FIG. 2, the wireless communication platform consists of two main components, the main transfer modules 14,16 and access nodes 18. The main transfer modules (MTM) 14,16 are designed for long range, high-bandwidth transfer in metropolitan settings of range easily exceeding one mile, and the access nodes (AN) 18 are designed for 360° access coverage of minimum radius of 0.2 Miles with repeater capable settings.

The main transfer modules 14,16 use state of the art wireless technology that is made for MAN (Metropolitan Area Network). To safeguard this kind of transmission distance and quality, the antenna of each of the MTMs 14,16 is mounted on a tripod 30 capable of reaching heights upwards of 25 ft, as shown in FIG. 1. The tripods 30 ensure that no interference from ground level will interrupt the communication (i.e. cars, busses, small houses . . . ). The tripod 30 is constructed of polished steel telescoping tubes. The tubes are raised one section at a time and clamped into place. The tubes can also rotate in order to point the antenna in the direction of the field command post 12. Two of the tripods legs are adjustable for leveling for uneven terrain. The overall stored length is 5.5 ft., and the tripod 30 weighs 39 lbs. Preferably, the tripods 30 can be set up by one person in under 5 minute.

As an alternative to the tripod 30, the main transfer modules 14 or 16 could also be mounted to a balloon or some other similar device. When mounted to a balloon, the MTM 14,16 could be elevated above the tallest building, thus eliminating the line of sight interference with the access nodes.

The main transfer modules 14,16 operate in the 5.8 GHz ISM band which requires no licensing permit or fee. The MTMs 14,16 also uses Wide-Band Orthogonal Frequency Division Multiplexing (W-OFDM) technology that is able to provide non-line of sight coverage specifically designed for use in metropolitan areas, a common place for extremely high level of noise that are bound to drown out even the strongest of signals. By using long range W-OFDM technology, the main transfer modules 14,16 are capable of transferring signals that are able to tolerate strong multipath and fast changing selective fading by using powerful equalization scheme combined with a forward error correction scheme. The main transfer modules use proprietary phase randomization over RF link, protecting data from eavesdropping. This method of transmission is also the basis for the 802.16 protocol, which is compatible with IP bases, open source technology employed by today's digital standards. Using this main transfer module assures compatibility, scalability, and bandwidth for the next generation of wireless communication and integration.

The main transfer modules are designed into sectors, each delivering data rates up to 32 Mbps. This amount of bandwidth allocation makes the wireless network highly scalable and capable of sustaining many of today's advancing technologies. As 802.16 technology advances and more products become available using this technology, future upgrades in portability, distance requirements, and capabilities will easily integrate into the system. The entire size of the MTM antenna is 1 ft. square, and weighs 4.5 lbs. The option to have a field strength meter is possible to ensure proper alignment to the field command post 12. However, in most circumstances, pointing the main transfer module 16 in the general direction of the field command post 12 should suffice due to the module's NLOS capabilities.

The main transfer module 16 is connected to a connection-junction box that is mounted near the base of the 25 ft. tripod. The connection-junction box contains the necessary components to convert and split up the data load from the field for transmission to the field command post 12 through the main transfer module 16. The connection-junction box provides the necessary conversions between the communications within the communication area 26 and the field command post 12. The connection-junction box contains the necessary connectors that make connection extremely simple, since there are only two cables that need to be connected. The cable connectors can not be mixed up since they are of different construction.

All portable equipment in the field within the communication area 26 can be accessed by the access node 18, which consists of an omni-directional antenna and an access module. The access node 18 is designed with simplicity in mind. Simply deployed alone or attached to an observational platform 20, the access node 18 will automatically provide a minimum of 0.2 miles radius coverage. Typically, the antenna for the access node 18 is 6.5 ft. tall, and is easily attached to a tripod 32 before it is extended into the air. The omni-directional pattern of the antenna of the access node 18 allows the user to station the tripod 32 in any situation and not have to worry if the antennas are lined up. Each access node 18 can easily be made into a repeater for retransmission of a signal from another access node in situations when signal strength must be improved or to go around a large dense obstacle.

The entire wireless communication platform is powered by a single common battery module. The battery and all charging components are self contained in a single Pelican case (1300 Series). The battery module is built with four power redundancy systems to ensure devices are powered at all times. One normal operation charge of the battery will power each platform upwards of 24 hours. If more time is needed at the scene, a number of solutions for power are available:

The supplied battery pack could be switched out with another one that is fully charged.

Due to the extensive power module requirements in deployability and length of operation, car/lawn batteries are the only batteries that come pre-charged with this kind of power to provide common readily battery source option. A car/lawn battery could be purchased from a hardware store and connected to the supplied battery pack. This will power the system for another 4-5 days.

The observation platform 20 could be run off of a vehicle or portable generator if extremely long periods of time are needed (upwards of 1-2 days).

If obscure options for power are really needed, a solar panel charging system has been designed to fit this system. Also, if 120 VAC is accessible the system could be powered by this as well, but is not recommended for deployment purposes.

All of the components mentioned for the wireless communication platform, except for the tripod, are all packaged into a roll-out carrying case that holds the main transfer module 16, connection-junction box, and the battery pack units. Once the tripod 30 is set up, the main transfer module 16 is mounted to the top of the tripod 30, which requires no tools. Once mounted to the tripod, the supplied battery pack unit is connected to main transfer module 16.

After the observation platforms 20, the access node 18 and the main transfer module 16 are deployed on the scene, tactical officers have a wide variety of tools available to them to ensure officer safety and interoperability. As illustrated in FIG. 1, the crisis scene 11 is contained within the communication area 26 such that field agents near the crisis scene 11 can be provided with information from either the observation platforms 20 or information provided by the field commend post 12. To provide this information, a series of field agent units 24 are provided to each of the field agents.

A field agent unit 24 is a light weight, portable electronic device that increases situation awareness through access of sensors on the field, uses of digital audio and visual communications, and access to other tactical digital data in one single device. The field agent unit 24 provides a bridge to deployed law enforcement personnel to provide the personnel with real time portable digital communication and intelligence across the global internet, all through a secure channel. Currently, there are two types of contemplated field agent units 24, a portable viewfinder and a laptop based unit, although other types of units are contemplated.

The portable viewfinder is a handheld device, such as a PDA, capable of communicating at high bandwidth giving field agents streaming real time digital feed as long as agents stay within access node communication area 26. The currently developed model is a light weight GSM/GPRS, Wi-Fi, and Bluetooth enabled device that allows for expandability and communication redundancy. The portable viewfinder can also be used by a sniper on top of a roof to ensure correct identification of subjects from a distance.

The laptop based field agent unit 24 offers a much larger viewing screen for better communication with command, picture sending, and video conferencing. As with the portable viewfinder, high bandwidth can be achieved without any dial-up, configuration, or additional devices as long as the agent is within the communication area 26 of the infrastructure created by the wireless communication platform including the access node 18.

The use of IP phones within the infrastructure is also possible, thus giving each officer the ability to communicate with any other officer at the scene. The use of IP phones will allow situational awareness of the internal crime scene. This gathered intelligence can then be transferred to tactical officers on the crime scene in order to allow them the best choice alternatives when entering the suspect's facilities.

One of the important features of the system including the field agent units 24 is the ability to have all of the same information displayed on each unit at the same time. This is achieved from the field command post by the leading commander. The common operational picture or video can be sent to each of the field agent units 24, as selected by each commander, and can be taken from various different video feeds. As an example, the video feed to each of the field agent units 24 could come from a sniper, a tactical entry team or a hostage negotiation throw unit, such as the Direct-Link system presently available from Enforcement Technology Group of Milwaukee, Wis. The common operational picture allows the various field agents to view and share intelligence and allows the commander to control the distribution of information. Another important feature of the field agent units 24 is the GPS tracking ability. If an officer happens to go down in rare circumstances, the field agent unit 24 can be located via GPS.

During a crisis situation, the field command post 12 receives various information from each of the observation platforms 20 and the remote sensors 22. The information received at the field command post 12 can then be viewed by the commanding officer. Based upon the information being viewed by the field command post 12, the commanding officer can then select the information that will be most relevant to the deployed field officers. This relevant information is then sent back to the access node 18 through the communication between the main transfer modules 14,16. If the field agent units 24 are within the communication range of the access node 18, the information selected by the commanding officer can then be viewed by the deployed officers on each of the field agent units 24. In this manner, the commanding officer can control the information provided to each of the field agent units 24 from a remote, field command post 12.

As shown in FIG. 2, the field command post 12 will provide the commanding officer secure communication with personnel on the field, or across the internet. At the same time, it can transparently record digital video surveillance, take still digital photos from the perimeter, and help prepare tactical data for redistribution to multiple sources.

The field command post 12 is made up of two main components, a perimeter surveillance command unit (PSC) 34 and a commander communication unit (CCU) 36. These units are designed to be situated inside a tactical van and are connected to communicate with the wireless communication platform, including the MTMs 14 and 16 and access nodes 18. The receiving side of the MTM 14 can be configured similarly to the one deployed on the crime scene, with the 25 ft. tripod. However, it is preferred that the receiving antenna of the MTM 14 be mounted onto the tactical van's current antenna system. The cyber ability of the system is provided by the connection to the internet interface layer 38.

The primary function of the perimeter surveillance command unit 34 is to give the commander the ability to control, view, and record all perimeter surveillance in one collective interface. The secondary function of the PCU 34 is to provide live video feed of the gathered surveillance intelligence to the commander communication unit 36. The standard package is capable of recording a minimum of 24 hours worth of video and audio. Additional storage is readily available through upgrade of hard drive and/or adding a storage server.

If room is an issue, software can be uploaded to already existing IBM-Based PC's that meet minimal requirements, however it is not recommended due to complexity of set-up and use:

PC
Pentium III or higher
512 MB Ram
300 GB hard drive (7,200 rpm)
Video Card
VGA output, dual monitor CRT output (recommended)
RJ-45, USB connection
Windows 2000, 2000 professional, XP or XP Professional
Monitor
1280×1024 (24-bit)
17" Flat panel (recommended)

The primary function of the commander communication unit 36 is to offer real time communication with both the personnel on the field, and on the internet, all through one simple to use interface. The system creates a modular and scalable system that can be used with multiple individuals and multiple input sources. Communications with field agents through wireless transmission establishes encrypted digital communication between the field command post 12 and the communication area 26 including the crisis scene 11. The abilities of the commander communication unit 36 to communicate with the field agent units 24 are listed as follows:

Give both voice and text commands
Broadcast real time 30 fps multiple operational surveillance
Give real time annotated graphics
Receive feedback through video, audio, text, and pictorial means.
Transmit pictures, diagrams, map, or any other pictorial INTEL The ability to communicate with personnel through internet interface 38 allows the commander the ability to receive expert advice from expert 40 through internet connection, while providing the expert 40 with real time operational coverage. The abilities of the commander communication unit 36 to communicate to the expert 40 are listed as follows:

Broadcast real time 30 fps multiple operational surveillance
Give both voice and text commands
Give real time annotated graphics
Receive feedback through video, audio, text, and pictorial means.
Transmit pictures, diagram, map, or any other pictorial INTEL Depending on the situation, the monitoring system 10 has communication protocols in place that supply multiple and diverse interface paths to connect to the internet. Since there is no way to ensure that the tactical van will have the optimal internet connectivity option at all times, the internet interface layer 38 has been devised with redundancy options. This will ensure that the field command post 12 will have cyber command capabilities in any situation or environment. The following are the internet options currently available within the Internet interface layer 38:

1) Subscription Based Connectivity (Downstream/Upstream):
PCS based 100-300 kbps/50-100 kbps—internet link through mobile cellar network.
Satellite based 500 kbps-1 Mbps/100-200 kbps—mobile satellite equipment
Dial-Up/GSM based 30-54 kps/10-40 kps—Dial-up through land line or cellar phone

2) Broadband Connectivity (Downstream/Upstream):
Wifi connectivity through local infrastructure 500 kbps-1 Mbps/300 kps-700 kbps—Much of urban area today already have it (park, coffee shop, offices, cities like Spokane)
Lan connectivity 500 kbps-1 Mbps/300 kps-700 kbps—If broadband connectivity is available nearby, we have equipment that can bring the connection to the command unit via wire or wireless transmission.

A firewall is built into the interface layer 38 to protect against unauthorized intruders. All data including video and audio feed is protected by the encryption layer 42 that offers up to five layers of protection both wirelessly, and through the internet.

The monitoring system 10 of the present invention is run by collection of modular plug-in software that allows for customizable control of its system configuration. Dependant on the individual situational need, software can be adapted with preconfigured plug-in collections which also can be modified when necessary. These plug-in are based on several web technologies allowing it to run on multitude of computing devices including the main command module 14,16 and field agent units 24. The plug-ins are separated in three groups, transport (which includes web sharing technologies), driver (devices specific), and system (configuration, display, and recording functions). Plug-in based platform allows for simple software integration and upgrades. For example: Plug-in of video/audio camera allows for integration of a pre-specify IP camera that seamlessly connects the camera's video and audio, from any connection point within the network as long as the IP of each specific camera is known. This allows for much flexibility in physical positioning because of IP based configuration and because the software is based on plug-in model, upgrades or new hardware can be adapted to the system as they become available as long as they are IP compliant.

In accordance with the present invention, different internet connection operations are available within the internet interface layer 38. A first internet option is a Broadband Internet Connection (such as by using WiFi) to provide a local area network (LAN). The Broadband Internet Connection will provide real time virtual reach back with authorized personnel anywhere across the globe, permitting real time feedback from experts and full video conferencing with video streaming. The Broadband Connectivity will permit full video, audio and pictorial depictions and will permit real time broadcasts of up to 30 fps of the field visuals. The Broadband Internet Connectivity will allow for real time audio and text communication, the broadcast of high quality replays, snapshots and annotated graphics.

In addition to Broadband Internet Connectivity, the internet interface layer 38 can be provided by a subscription based connectivity, such as through PCS, satellite or GSM. Subscription based connectivity will allow for virtual reach back with semi-real time and limited quality, depending upon the connection interface. The subscription based connectivity will allow for real time feedback from experts, video conferences with some delay or very limited delays. Subscription based connectivity will provide video, audio and pictorial depiction capabilities with real time broadcast of up to 20 fps for the field visuals. Audio, text and annotated graphics will be broadcast in real time and snapshots and high quality replays can be broadcast to fill the units as desired.

The field command unit 12 of the present invention provides a commanding officer the ability to distribute real time intelligence to outside sources via the internet for expert advice and support. As shown in FIG. 2, the outside expert advice provided by the client 40 is accessible through the field command post 12 through the internet layer 38. In addition, a commander has full control over the camera positions and views through the field command post 12 such that the commander can control the video seen by the outside expert. The field command post 12 is a modular system that allows additional components to be added in the future. For example, IP phones, robotic controlled devices and other additional future technologies are contemplated as being used with the system of the present invention.

As can be understood by the description of the invention provided above, law enforcement or emergency response personnel can be positioned at the field command post 12 and can monitor the situation at the crisis scene 11 through the multiple observation platform 20 and remote monitoring sensors 22. The field command post 12 communicates to the access node 18 through the pair of main transfer modules 14,16. Since the main transfer modules 14,16 can currently be positioned up to one mile from each other, the field command post 12 can be located a safe distance from the crisis scene 11. It is contemplated that this range could be expanded to greater than one mile as well. Further, since the field command post 12 contains a connection to the internet 38, the field command post 12 can communicate, in real time, with an outside expert 40. The outside expert 40 can be provided with real time images from the crisis scene 11 and can communicate with the field command post 12 in real time.

Based upon information from the outside expert 40, personnel at the field command post 12 can relay images, instructions or other types of information to field agents within the communication area 26. Specifically, each of the field agents would have one of the field agent units 24 that receive information from the access node 18, as provided by the field command post 12. The information provided to the field agent units 24 can be selected information received from any one of the multiple observation platforms 20 or one of the monitoring sensors 22. As an example, in a hostage situation, each of the field agent units 24 could be presented with a real time image of the hostages and the suspect taken by one of the multiple observation platforms 20. Based upon these images, a field agent can then respond accordingly, based upon information that would otherwise not be available to the field agent.

As shown in FIG. 1, the access node 18 can also relay information to a robotic unit 44. The robotic unit 44 can receive remote commands from the field command post 12 and can move around the crisis scene 11 as desired. The movement of the robotic unit may be monitored from the robotic unit itself or may be viewed by the multiple observation platforms 20.

Figure 3:
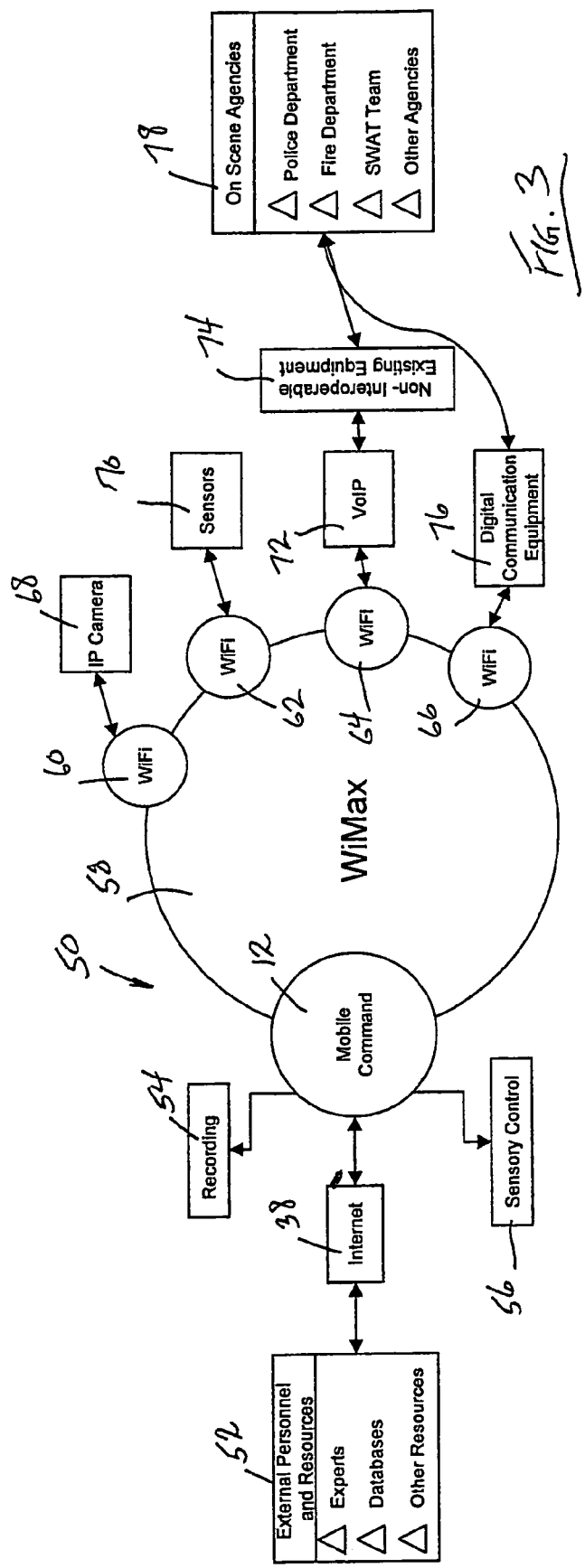
FIG. 3 is a schematic illustration showing a first alternate proposed implementation of the invention.

Referring now to FIG. 3, thereshown is an alternate embodiment of the surveillance and monitoring system 50. In the embodiment shown in FIG. 3, the field command post 12 is coupled to the internet 38 such that the field command post 12 can communicate with a variety of external personnel and resources 52. The external personnel and resources 52 can include experts, remote data bases or other resources. Further, the field command post 12 is in communication with a recording device 54 as well as a sensory control system 56. The recording device 54 records all of the images received at the field command post 12 for later viewing, if required.

As illustrated in FIG. 3, the field command post 12 can communicate with multiple devices utilizing a communication interface 58. In the embodiment of the invention illustrated, the communication interface 58 a WiMax system. The WiMax communication interface 58 allows the field command post 12 to communicate directly to multiple WiFi nodes 60-66. In the embodiment of the invention shown, the WiFi node 60 communicates with a camera 68 to provide control and information to and from the field command post 12. Node 62 receives information from monitoring sensors 70, while WiFi node 64 is connected by a voice over internet protocol (VoIP) system 72 to other non-interoperative existing equipment 74. The VoIP interface 72 allows for other types of devices to communicate using the WiFi communication protocol. Finally, node 66 is connected to digital communication equipment 76 such that unseen agencies 78 can communicate to the field command post 12 utilizing the communication interface 58.

Although the present invention is shown and described utilizing a pair of main transfer modules 14,16 and an access node 18 to communicate between the field command post 12 and the observation platform 20 and field agent units 24, it is contemplated by the inventors that each of the observation platforms 20, sensors 22 and field agents 24 could communicate directly to the field command post 12 through direct cellular communication techniques. In such an embodiment, video feed from the observation platform, as well as video feed from the field command post to the field agent units 24 must be compressed to provide the video feed in near real time at a viewable speed. In such an embodiment, each of the remote devices would communicate directly to the field command post 12 through the cellular network utilizing a transmission device and cellular adapter. The utilization of cellular communication directly between the field command post 12 and the remote devices further enhances the range of communication from the crisis scene 11 to the field command post 12.

Figure 4:
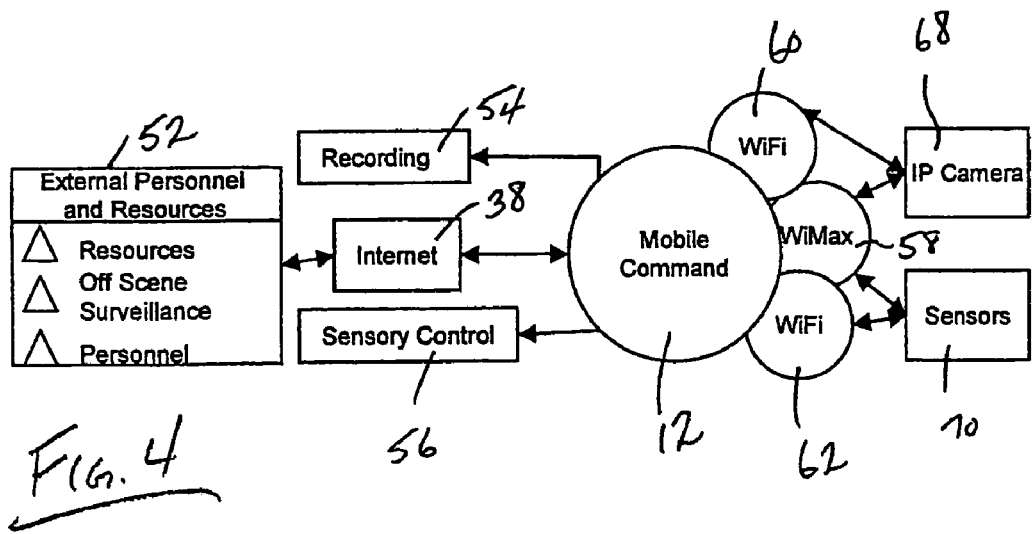
FIG. 4 is a block diagram illustrating an alternate manner in which the system utilizes all interoperable functionality.

Referring now to FIG. 4, thereshown is the use of the field command post 12 for daily use by emergency response teams or law enforcement personnel. In the embodiment shown in FIG. 4, the command post 12 can communicate with external personnel 52 over the internet connection 38. However, in the daily use shown in FIG. 4, the field command post 12 can communicate with remote cameras 68 and sensors 70 through the WiFi nodes 60 and 62 as well as through the communication interface 58. On a daily basis, the command post 12 can monitor the images from the remote cameras 68 and the sensors 70.

Figure 5:
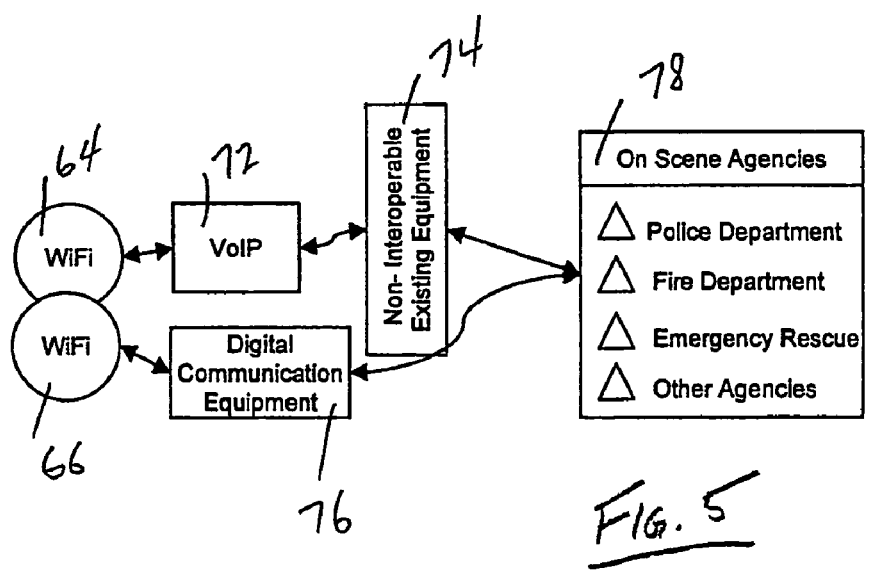
FIG. 5 is a block diagram illustrating how the system-of-systems can be used for daily routine activities.

FIG. 5 illustrates the use of the system of the present invention during daily routine activities that allows the non-interoperative existing equipment 74 and unseen agencies to communicate with the WiFi nodes 64 and 66 through the VoIP 72 and the digital communication equipment 76. Thus, the monitoring system of the present invention can be utilized on a daily basis to communicate with field personnel or monitor remote cameras/sensors.

Various alternatives and embodiments are contemplated as being within the scope of the following claims particularly pointing out and distinctly claiming the subject matter regarded as the invention.

What is claimed is:

1. A surveillance and monitoring system for use in monitoring a crisis scene, the system comprising:
    a plurality of observation devices selectively positionable at various locations surrounding the crisis scene and operable to provide monitoring information from the crisis scene, each observation device having a wireless transmitter for transmitting the monitoring information;
    a portable transfer module selectively positionable near the observation devices and the crisis scene, the transfer module being operable to receive the monitoring information from the observation devices, the transfer module being operable to retransmit the monitoring information; and
    a portable remote command post positioned remotely from the crisis scene to receive the retransmitted monitoring information from the transfer module and display the monitoring information, the remote command post being operable to transmit the monitoring information over a wide area network,
    wherein the portable remote command post is operable to transmit control signals to the observation devices through the transfer module such that the remote command post can control the operation of the observation devices.

2. The surveillance and monitoring system of claim 1 wherein the observation devices each include a camera and wherein the monitoring information is video signals.

3. The surveillance and monitoring system of claim 1 further comprising a portable second transfer module selectively positionable remotely from the crisis scene to receive the monitoring information from the transfer module and relay the monitoring information to the remote command post.

4. The surveillance and monitoring system of claim 3 wherein the transfer module communicates with the second transfer module using an radio frequency signal.

5. The surveillance and monitoring system of claim 1 wherein the wide area network is the internet.

6. The surveillance and monitoring system of claim 1 further comprising at least one field agent unit operable to receive the monitoring information from the transfer module.

7. The surveillance and monitoring system of claim 6 wherein the monitoring information received by the field agent unit is controlled by the remote command post.

8. The surveillance and monitoring system of claim 7 wherein the field agent unit includes a video display, wherein the monitoring information includes a video.

9. The surveillance and monitoring system of claim 5 further comprising an outside expert in communication with the remote command post over the wide area network, wherein the outside expert is operable to provide information to the remote command post.

10. A method of remotely monitoring a crisis scene, the method comprising the steps of:
    selectively positioning a plurality of observation devices at various locations surrounding the crisis scene, each observation device being operable to transmit monitoring information from the crisis scene;
    selectively positioning a portable transfer module near the observation devices and the crisis scene;
    receiving the monitoring information at the transfer module;
    positioning a portable remote command post remotely from the crisis scene;
    retransmitting the monitoring information from the transfer module to the remote command post;
    displaying the monitoring information at the remote command post;
    retransmitting the monitoring information over a wide area network from the remote command; and
    transmitting control signals from the remote command post to the observation devices through the transfer module, wherein the control signals control the operation of the observation device.

11. The method of claim 10 further comprising the step of providing a plurality of field agent units operable to receive monitoring information from the transfer module.

12. The method of claim 11 further comprising the step of transmitting the monitoring information to be displayed by the field agent units from the remote command post to the transfer module for retransmission to the field agent units.

13. The method of claim 11 further comprising the step of transmitting the monitoring information to an outside expert over the wide area network; and
    receiving response information from the outside expert at the remote command post.

* * * * *